United States Patent
Miller

[11] Patent Number: 5,992,720
[45] Date of Patent: Nov. 30, 1999

[54] AUTOMOTIVE SKI RACK

[76] Inventor: Kenneth T Miller, 123 Harbor Dr., #106, Stamford, Conn. 06902

[21] Appl. No.: 09/138,787

[22] Filed: Aug. 24, 1998

[51] Int. Cl.$^6$ ..................................................... B60R 9/00
[52] U.S. Cl. .......................... 224/509; 224/315; 224/504; 224/525; 224/917.5
[58] Field of Search ..................... 224/509, 495, 224/502, 504, 505, 506, 510, 511, 522, 523, 524, 525, 537, 315, 917.5, 924

[56] References Cited

U.S. PATENT DOCUMENTS

| | | | |
|---|---|---|---|
| 4,352,515 | 10/1982 | Schumacher | 293/145 |
| 4,785,980 | 11/1988 | Redick | 224/535 |
| 4,953,773 | 9/1990 | Wirth | 224/328 |
| 5,862,966 | 1/1999 | Mehls | 224/504 |
| 5,876,086 | 3/1999 | Lagrou et al. | 296/146.11 |

*Primary Examiner*—Gregory M. Vidovich
*Assistant Examiner*—Maerena W. Brevard

[57] ABSTRACT

A ski rack for a vehicle having a rear door, such as a sports utility automobile, or a van in which the rack holds several pairs of skis in tubes on a mounting board. The mounting board has an assembly for permitting lateral pivotal movement of the ski rack from a vertical position blocking the vehicle's rear door to a horizontal position adjacent to the rear bumper where the rear door of the vehicle is not obstructed.

8 Claims, 5 Drawing Sheets

200
AUTOMOTIVE SKI RACK

The present invention is directed to a rack for holding and transporting a multiplicity of pairs of skis on the rear of an automobile, such as a sports utility vehicle. The rack can be moved to a position, when mounted on the rear of the vehicle. The rack can be moved to a position, when mounted on the rear of the vehicle, whereby the rear door of the vehicle can be opened without interference by the skis or the rack they are mounted on.

Ski racks for mounting on the rear of a vehicle are known. For example, U.S. Pat. No. 5,641,108 to Ewer discloses a ski and bicycle rack for an automotive receiver hitch, which has a hinge pin to allow the rack to tilt downward away from the back of the automobile, however making it difficult to access the rear door of the vehicle since the rack and skis would lie flat on the road in front of the door. The same difficulty is inherent in U.S. Pat. No. 4,676,414 in which the lowered ski rack will interfere with access to the vehicle rear door. U.S. Pat. Nos. 5,449,100 and 5,547,116 to Eckhart show a bracket carrier which is said to be capable of being moved out of the way to the side when access to the rear of the vehicle is desired, however the exact structure and operation for accomplishing this movement is not defined. In any event, sideways movement of the ski carrier is not the same as disclosed in previous constructions, nor do they completely remove the obstruction to the rear door movement, as is the result of the present construction.

SUMMARY OF THE INVENTION

It is an object of the present invention to provide a ski carrier rack which is connected to a hitch of a vehicle that is provided with a plurality of open end tubes mounted on a backboard having yieldable inserts into which the skis are placed for preventing damage to the skier during transportation.

It is another object of the present invention to provide a ski carrier for a number of pairs of skis mounted on a backboard which can be pivoted laterally so that the entire ski carrier can be moved to a position parallel to the rear bumper of the vehicle and below the rear access door.

A further feature of the invention is to provide mounting tubes for the skis of a high impact plastic or metal.

Another object of the present invention is to provide a locking means for securing the skis in their respective tubes.

BRIEF DESCRIPTION OF THE DRAWINGS

The above and other objects and features of the invention will be apparent by reference to the following description of our invention and drawings.

DESCRIPTION OF THE PREFERRED EMBODIMENT

Figure 1:
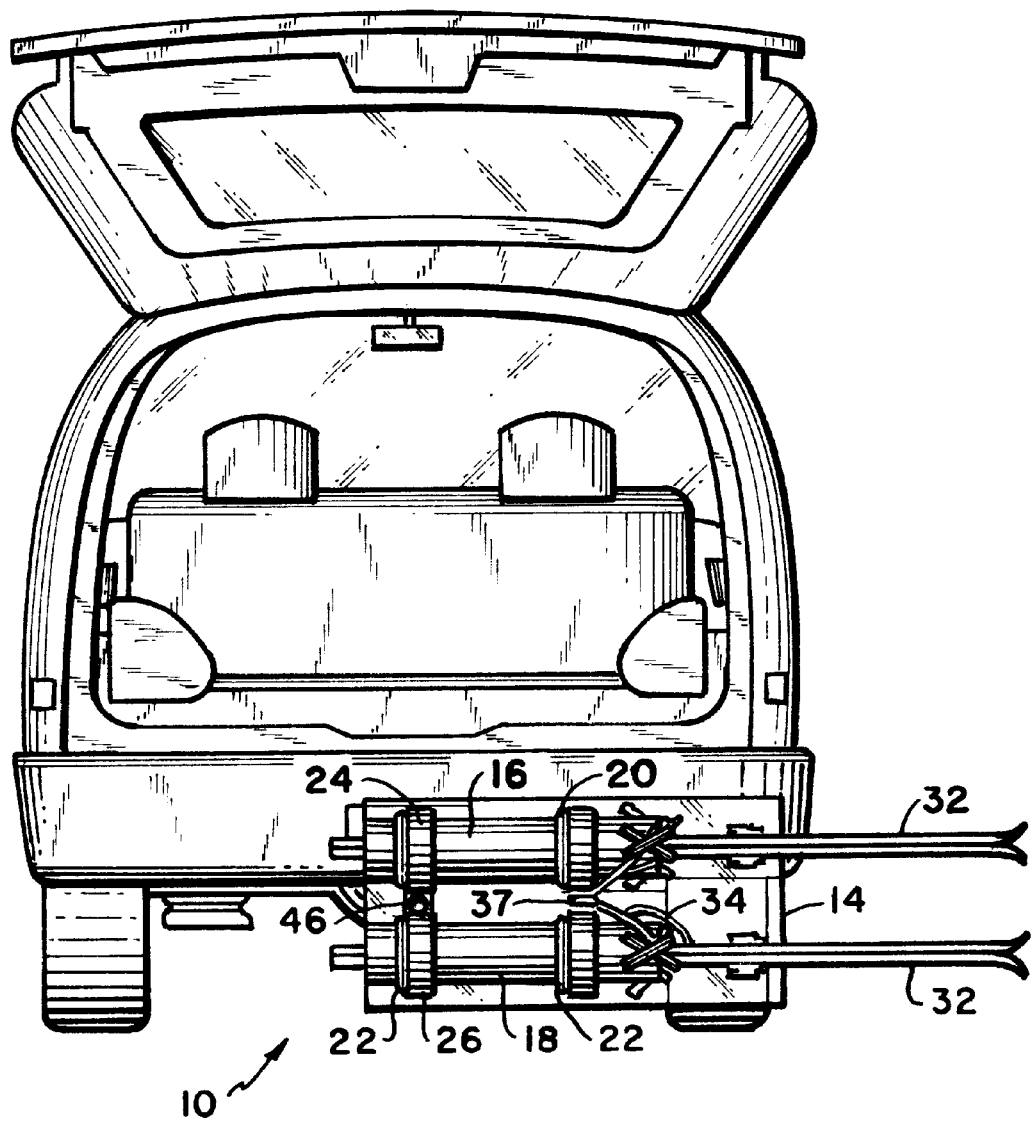
FIG. 1 is a rear elevation view of the ski rack with skis positioned therein and showing the rack mounted on the rear of a vehicle in position whereby the rear door of the vehicle is not obstructed from opening, all in accordance with the teachings of the present invention.

Referring now to the figures in the drawings, the present device is a ski rack assembly referred to generally by the numeral 10 which is constructed and arranged to be mounted on the hitch 12 of an automobile, and more particularly a vehicle having a rear door, such as a sport utility vehicle or a van. The hitch 12 is a receiver hitch of square cross-section.

Figure 2:
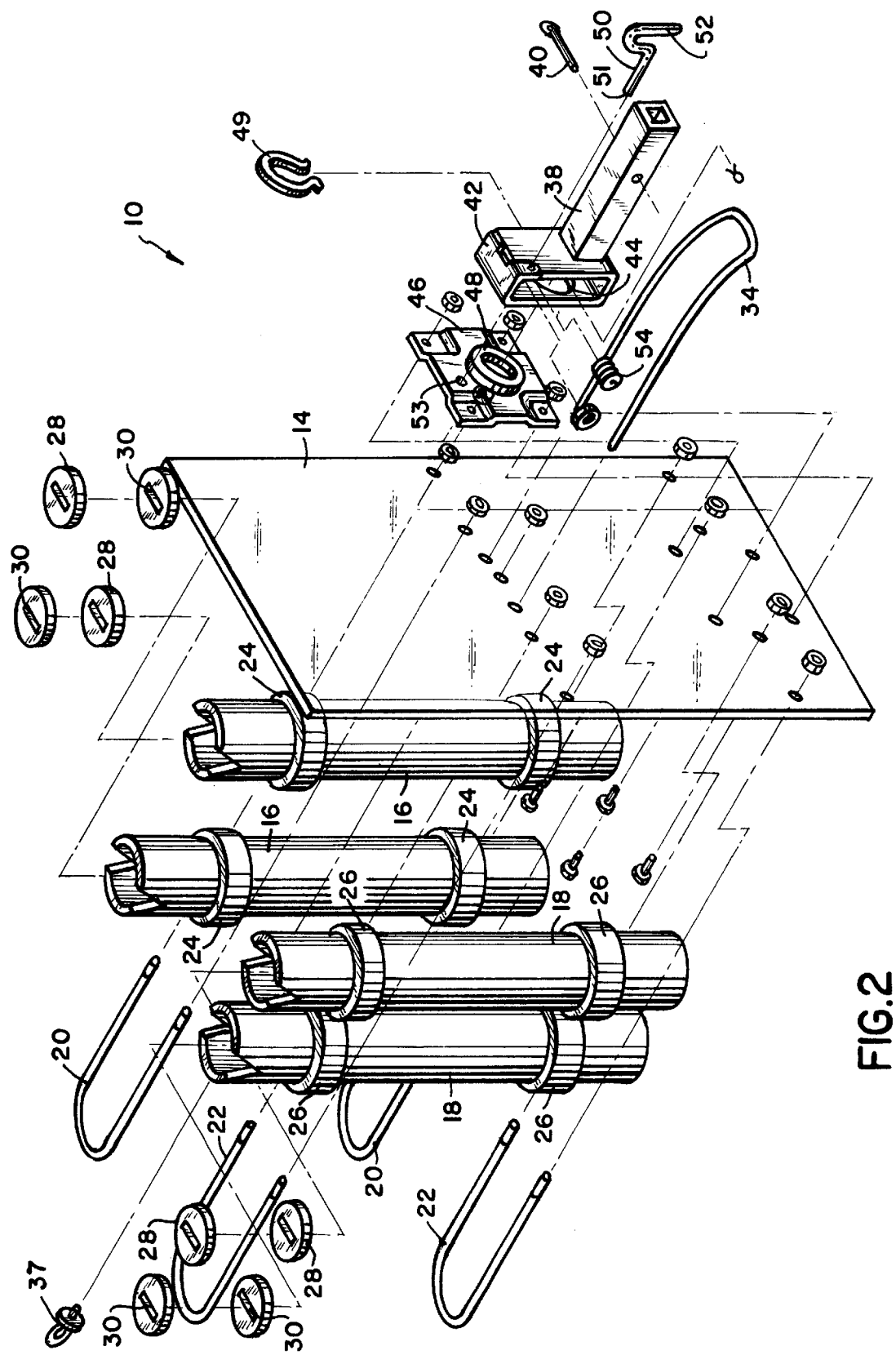
FIG. 2 is an exploded view of the ski rack assembly showing all the elements thereof, and their co-action.
Figure 3:
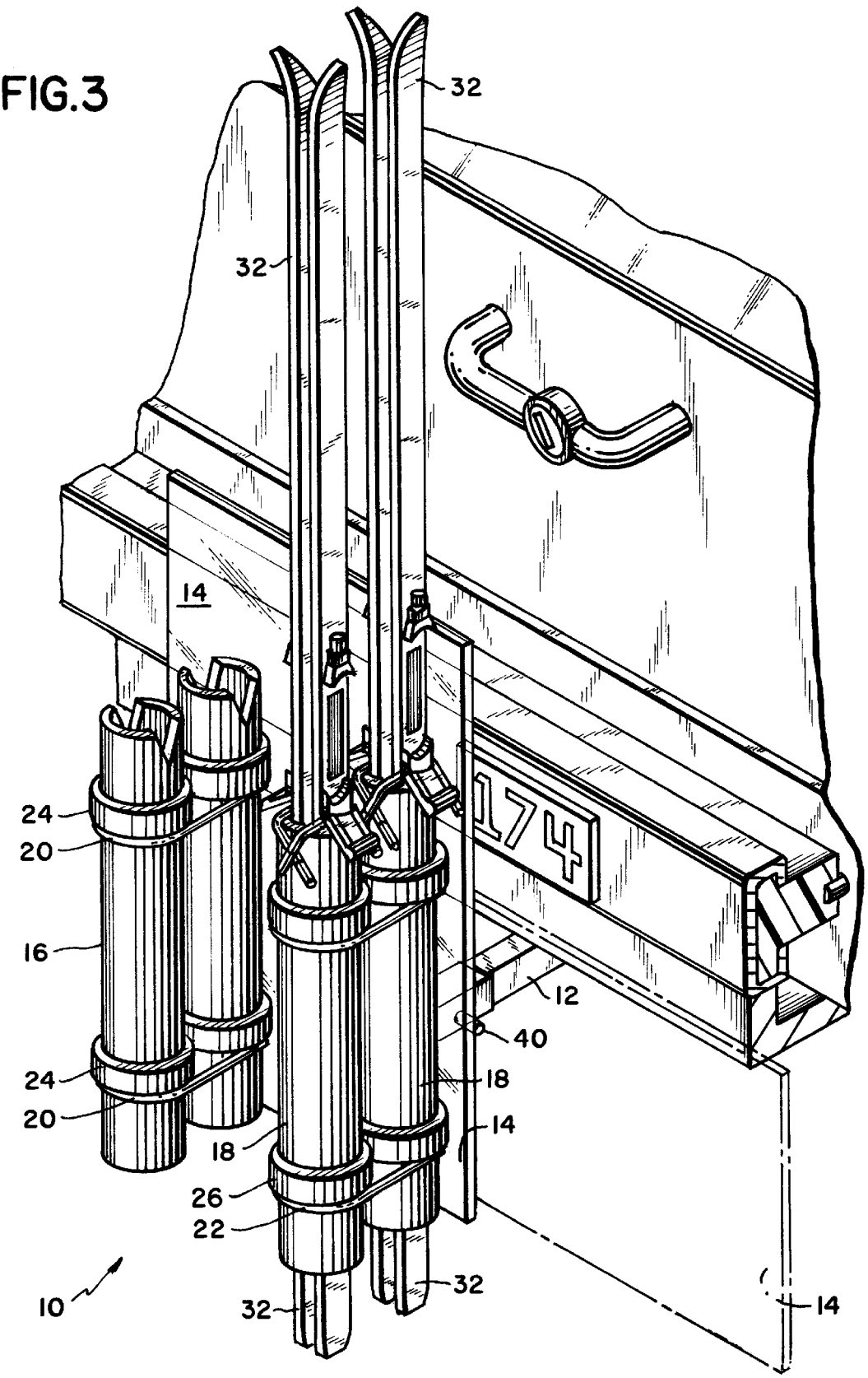
FIG. 3 is a partial perspective view of the present ski rack assembly mounted on the rear of a vehicle during transport.

The ski rack 10 is provided with a mounting board 14 to which pairs of tubes 16 and 18 respectively are held by means of U-shaped brackets 20 and 22 respectively. The tubes are preferably fabricated of a high impact plastic, such as PVC, or metal and are held in place and prevented from sliding downwards by means of collars 24 and 26, respectively, on the exterior of tubes 16 and 18. As seen in FIGS. 2 and 3 each tube is provided with disk inserts 28 of a flexible material having slots 30 for ski pairs 32. A pair of inserts are located in each tube at the top and bottom thereof in order to securely maintain the skis within the tubes. The flexible inserts prevent the skis from engaging the inside of the tubes made of a hard material and therefore are prevented from damage during transport, especially over rough roads or terrain.

Figure 4:
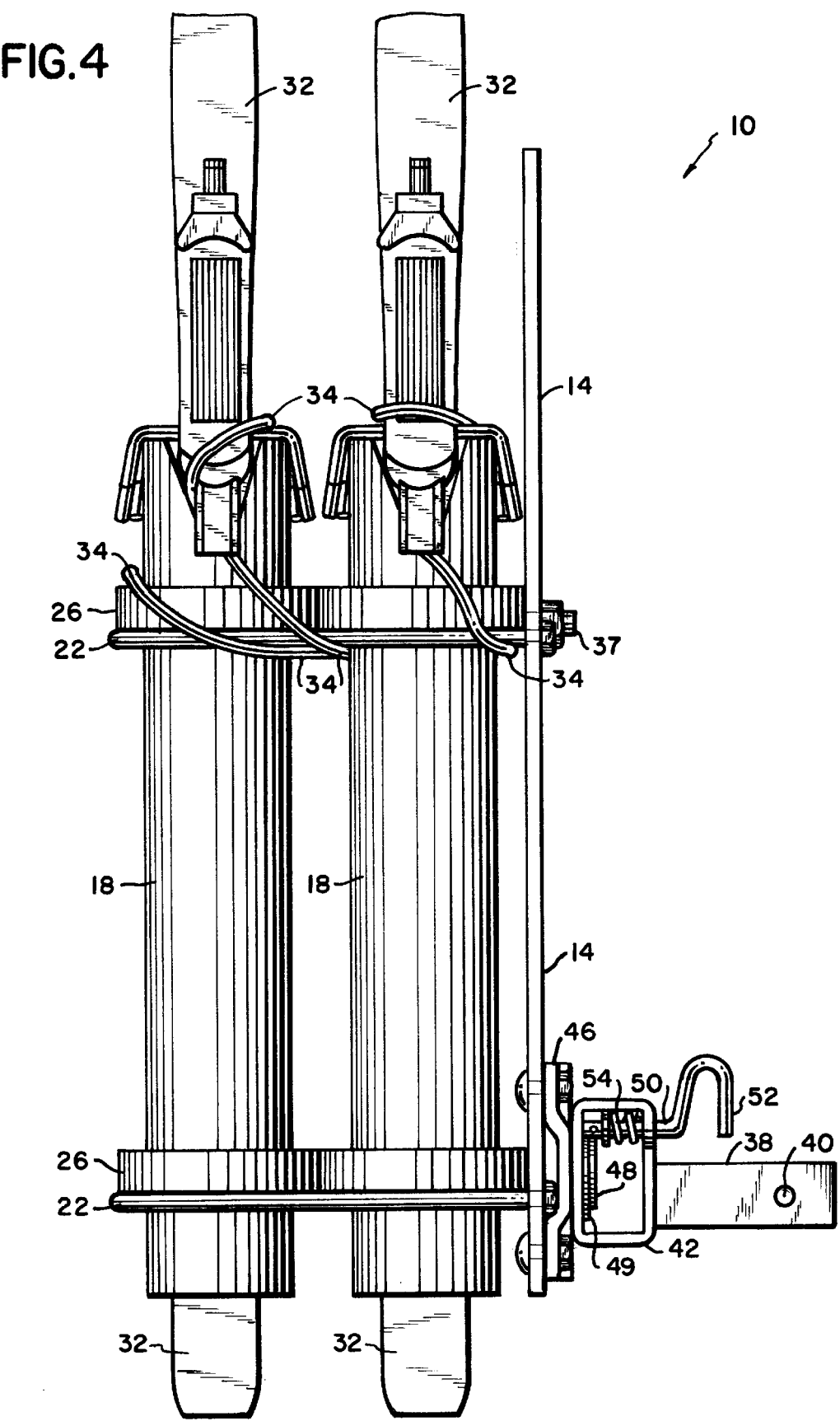
FIG. 4 is an enlarged view of the ski rack assembly, and the turning and latching structure in detail for the ski rack.
Figure 5:
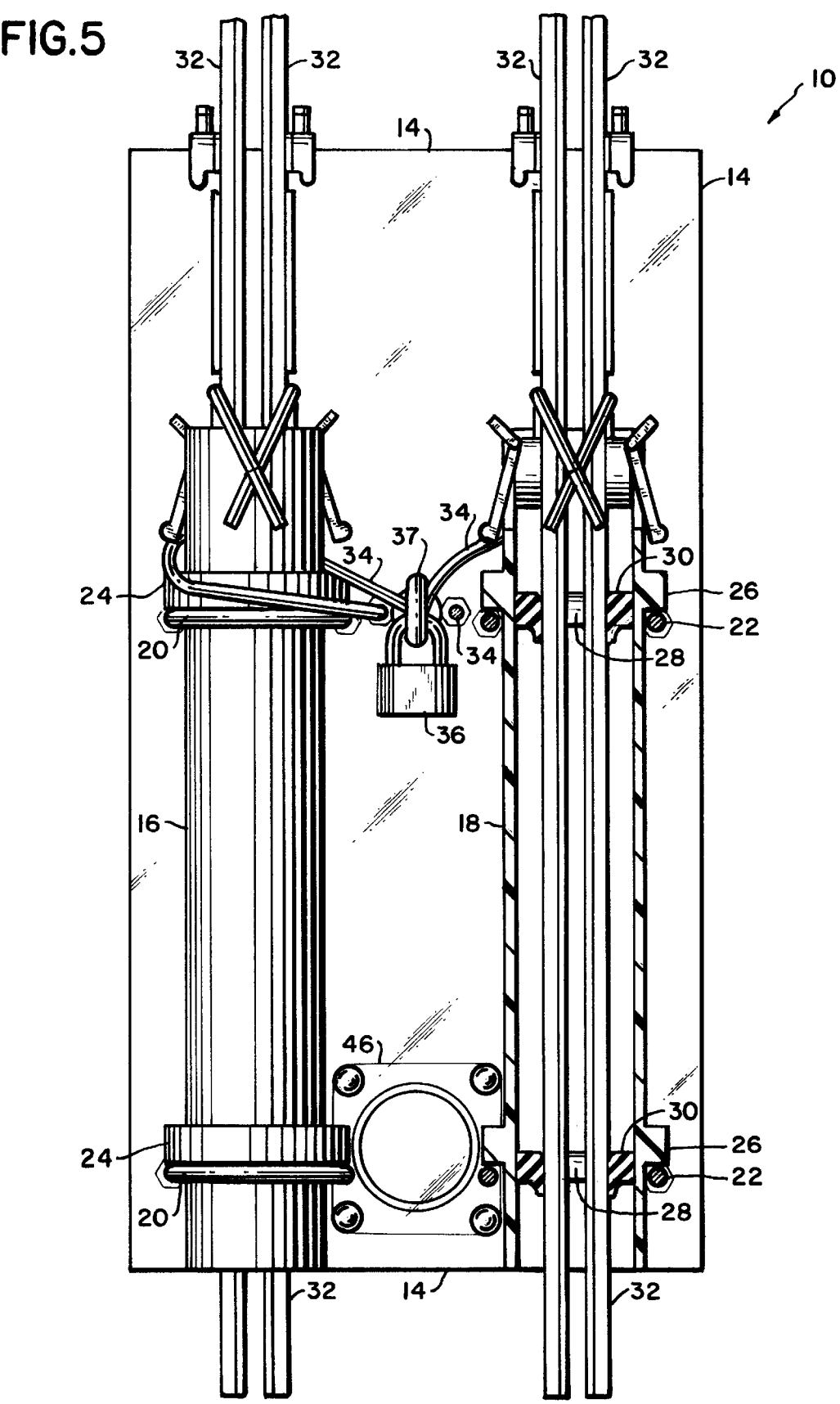
FIG. 5 is an elongated front elevation view of the ski rack assembly showing the locking mechanism in detail.

As seen in FIGS. 3, 4 and 5 each of the ski pairs can be secured in place on the rack by means of cable 34 and padlock 36 through ring 37.

Referring now to FIGS. 2, 3 and 4 the mounting board 14 is provided with a complimentary hitch 38 of square cross-section which is adopted to fit over the vehicle hitch 12, as particularly seen in FIG. 3 and in which a cotter pin 40 is also adopted to pass through aligned holes (not shown) in the mating hitches in order to attach the ski rack to the vehicle.

As seen in FIGS. 2 and 4, the mounting board 14 is also provided with a fixture 42 having a circular opening 44. Secured the back of the mounting board 14 is a relatively flat plate 46 having a raised circular flange 48 and a horseshoe-shaped collar 49. The fixture 42 has aligned holes through which pin 50 passes and the end of the pin 51 in the normal condition, is inserted in hole 53 in plate 46. The pin is provided with a handle part 52. Surrounding the pin 50 within opposite walls in the fixture 42 is a compression spring 54. In one position of the fixture 42 the circular opening 44 of the fixture is seated around the raised circular flange 48. In this position, as seen in FIG. 4, the ski rack with the ski pairs therein is held in a vertical position, as particularly seen in FIG. 3.

However, if it is required to remove the ski rack and the skis therein from blocking the rear door of a vehicle and to permit one to easily gain access to the rear of the vehicle, the ski rack assembly must be moved to a position shown in FIG. 1. In that event, a person will grab the handle 52 and pull it toward him or her to remove the pin end 51 of the pin 50 from hole 53 and against the pressure of spring 54 in order to pull the fixture 42 away from the flat plate 46 so that the circular opening 44 of the fixture is removed from the raised circular flange 48. When this occurs the mounting board 14 and the ski rack thereon can be pivoted sideways so that the entire ski rack unit, with the skis thereon, can be moved from a vertical position to a horizontal position which is clear of the rear door. Consequently, a person can stand adjacent to the rear of the vehicle for easily retrieving articles in the back of the vehicle, as well as placing articles therein.

While the present invention has been disclosed and described with reference to a single embodiment it will be apparent that changes and modifications may be made therein, and it is intended in the following claims to cover each such variation and modification as falls within the true spirit and scope of the present invention.

What is claimed is:

1. An automotive ski rack for a vehicle having a receiver hitch, a rear door and a rear bumper comprising: a mounting board, at least one ski holder, means for fixing said ski holder on said mounting board, a hitch on said mounting board for connecting to said receiver hitch on said vehicle, a manually operated fixture on said board engaging said board and which maintains said ski holder in a vertical position blocking access to said rear door, and said ski holder is movable laterally to a horizontal position parallel to said rear bumper so that said rear door is unobstructed when said fixture is pulled away from engagement with said board and is pivoted sideways to said horizontal position.

2. An automotive ski rack as claimed in claim 1 wherein said mounting board includes a plurality of open ended tubes having cushioning means therein for maintaining said skis yieldably in the interior of said tubes.

3. An automotive ski rack as claimed in claim 2 wherein said cushioning means are disk inserts having slots for receiving skis.

4. An automotive ski rack as claimed in claim 1 further comprising locking means for said skis.

5. An automotive ski rack as claimed in claim 1 wherein said means for fixing said ski holder on said mounting board is a U-shaped bracket.

6. An automotive ski rack as claimed in claim 4 wherein said locking means is a cable and a padlock.

7. An automotive ski rack as claimed in claim 1 wherein there are four open ended tubes fabricated of a high impact plastic material.

8. An automotive ski rack as claimed in claim 1 wherein said fixture is spring loaded.

* * * * *